United States Patent [19]
Erstad et al.

[11] Patent Number: 6,053,787
[45] Date of Patent: Apr. 25, 2000

[54] MULTI-COURSE SWIVEL

[75] Inventors: Niles Jostein Erstad, Ask; Kåre Syvertsen, Arendal, both of Norway

[73] Assignee: Den Norske Stats Oljeselskap A.S., Stavanger, Norway

[21] Appl. No.: 09/011,548

[22] PCT Filed: Aug. 6, 1996

[86] PCT No.: PCT/NO96/00198

§ 371 Date: Jul. 1, 1998

§ 102(e) Date: Jul. 1, 1998

[87] PCT Pub. No.: WO97/06049

PCT Pub. Date: Feb. 20, 1997

[30] Foreign Application Priority Data

Aug. 7, 1995 [NO] Norway ................................. 953095

[51] Int. Cl.[7] .................................................. B63B 22/26
[52] U.S. Cl. ................................................ 441/5; 405/224.2
[58] Field of Search ................................ 405/195.1, 223, 405/224, 224.2, 224.3, 224.4, 201; 441/3, 4, 5

[56] References Cited

U.S. PATENT DOCUMENTS

| | | | |
|---|---|---|---|
| 3,237,220 | 3/1966 | Brandt | 441/5 |
| 4,602,586 | 7/1986 | Ortloff | 441/5 |
| 4,639,228 | 1/1987 | Bulow | 441/5 |
| 5,205,768 | 4/1993 | Pollack | 441/5 |
| 5,288,253 | 2/1994 | Urdshals et al. | 441/5 |
| 5,318,385 | 6/1994 | Goulart et al. | 405/224.2 |
| 5,515,804 | 5/1996 | Pollack | 441/5 |
| 5,823,837 | 10/1998 | Boatman et al. | 441/5 |

FOREIGN PATENT DOCUMENTS

| | | | |
|---|---|---|---|
| 146900 | 9/1982 | Norway . | |
| 2170534 | 8/1986 | United Kingdom | 405/224.2 |
| 9324731 | 12/1993 | WIPO . | |
| 9324732 | 12/1993 | WIPO . | |

Primary Examiner—Eileen Dunn Lillis
Assistant Examiner—Frederick Lagman
Attorney, Agent, or Firm—Kenyon & Kenyon

[57] ABSTRACT

A rotating coupling device or connector for interconnection between a number of risers (12) suspended from a submerged buoy and a pipe system on a floating vessel for the production of hydrocarbons, comprising a swivel unit consisting of a pair of concentric swivel members (20, 21) in the form of a male member (20) and a female member (21) defining mutually sealed annuluses (22) communicating with associated fluid paths (16) between the topical risers (12) and the pipe system on the vessel. The female member (21) is adapted for non-rotatable attachment to the vessel. The male member comprises a number of axially extending pipes (24) which, at their upper ends are connected to respective annuluses (22) and at their lower ends comprise a releasable connection (25) with fluid paths (16) leading to the respective risers (12). The fluid paths (16) are arranged in a thick-walled top plate (15) which is adapted to be fastened to the top of the buoy, and which, at the lower ends of the fluid paths (16), comprises a releasable interconnection (18) with the upper ends of pipes (17) leading to the risers (12).

10 Claims, 6 Drawing Sheets

MULTI-COURSE SWIVEL

The invention relates to a rotating coupling device or connector for interconnection between a number of risers suspended from a submerged buoy and a pipe system on a floating vessel for the production of hydrocarbons, comprising a swivel unit consisting of a pair of concentric swivel members in the form of a male member and a female member defining mutually sealed annuluses communicating with associated fluid paths between the topical risers and the pipe system on the vessel, the male member comprising a number of pipe courses having upper ends connected to respective annuluses and lower ends communicating with the respective risers, and the female member being arranged for non-rotatable securing to the vessel.

A rotating connector comprising cooperating swivel members of the above-mentioned type is, for example, known from Norwegian patent application No. 932460. This application describes a system for offshore production of hydrocarbons by means of a vessel which is arranged for quick connection to and disconnection from a submerged buoy, wherein the buoy is of the type comprising a bottom-anchored centre member which is connected to a number of risers extending up to the buoy, and an outer buoyancy member which is rotatably mounted on the centre member and can be introduced into and locked in a submerged downwardly open receiving space in the vessel. At the upper end of the buoy there is arranged a rotating coupling or swivel device of the stated type, wherein the swivel members define mutually sealed annuluses (annular spaces) communicating with associated fluid paths in the swivel members, for the transfer of a process fluid and possible injection fluids between the risers and a pipe system on the vessel. The female swivel member is permanently fastened to the centre member of the buoy, whereas the male member is connected to an operating means on the vessel, so that the swivel members can be introduced into and withdrawn from each other by the operating means, the swivel members in the interconnected condition defining said annuluses. On each side of the annuluses sealing means is provided which can be activated by means of a pressure fluid to form a seal between the annuluses, and which can be relieved in case of mutual disconnection of the swivel members.

The coupling device according to the above-mentioned patent application is constructed for use in connection with buoys receiving a small member of risers, more specifically three risers, for example one for well flow, one for water injection and one for gas injection. This construction is less practical and suitable when it is the question of use in connection with buoys receiving a larger number of risers. The known solution then would involve a relatively complicated and space-demanding female member structure, and this would be not very economic and practical since each buoy would have to be equipped with such a female member with the necessary number of fluid paths.

Thus, it is an object of the invention to provide a rotating connector which is suitable for building-in of a relatively large number of fluid paths for pipe courses, for use in connection with buoys having a corresponding number of risers.

Another object of the invention is to provide such a coupling device or connector which has a relatively simple and compact construction, at the same time as it allows a quick disconnection and also a relatively quick connection to the topical buoy.

The above-mentioned objects are achieved with a rotating connector of the introductorily stated type which, according to the invention, is characterized in that the pipe courses are constituted by axially extending pipes which, at their lower ends, comprise a means for releasable interconnection with fluid paths leading to the respective risers, said fluid paths being arranged in a thick-walled top plate which is arranged to be fastened to the top of the buoy, and which, at the lower ends of the fluid paths, comprises a means for releasable interconnection with the upper ends of pipes leading to the risers.

The invention will be further described below in connection with an exemplary embodiment with reference to the drawings, wherein FIG. 1 shows an axial longitudinal section of a rotating connector according to the invention;

Figure 1:
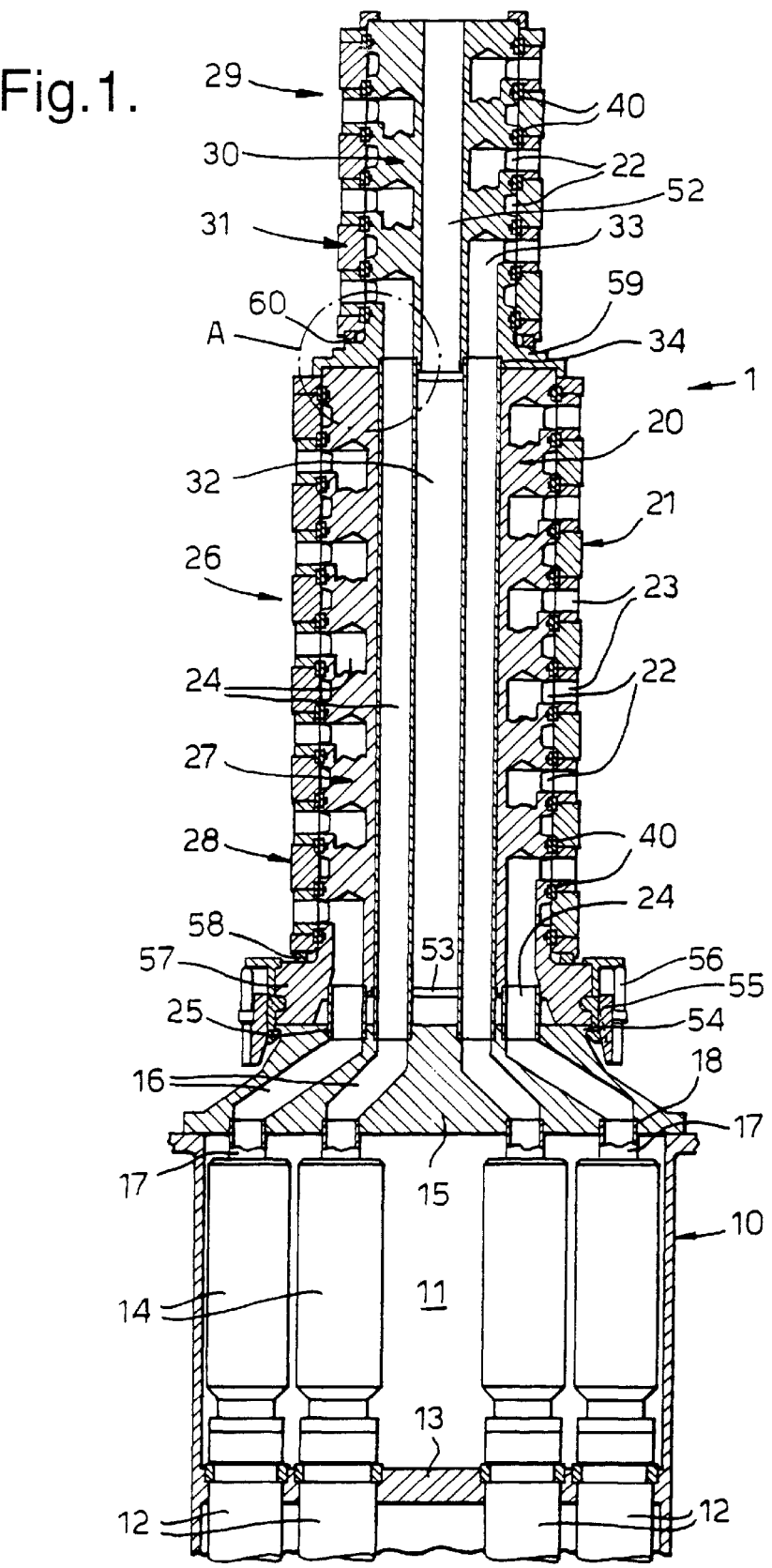

The rotating coupling device or connector 1 according to the invention shown in FIG. 1 is shown to be mounted at the top of a buoy of which only a detail of the upper portion of a central member 10 of the buoy is shown in the Figure, but wherein the buoy is presupposed to be introduced and releasably secured in a receiving space (not shown) in a vessel for the production/-processing of hydrocarbons. The buoy is presupposed to be a submerged, so-called STL or STP buoy (wherein STL and STP are abbreviations for "Submerged Turret Loading" and "Submerged Turret Production", respectively). For a further description of buoys of the topical type reference may, for example, be made to the Norwegian laying-open prints Nos. 175 419 and 176 130.

The illustrated portion of the central member 10 of the buoy defines a compartment 11 for the receipt of the topical number of risers. In the present case the buoy is presupposed to receive eighteen risers, more specifically twelve 6" risers and six 9" risers which are arranged in the pattern shown in FIG. 5. The compartment 11 is presupposed to have a diameter of about 2, 7 m.

In FIG. 1 there are shown four risers 12, and these are suspended from a suspension plate 13 in the central member of the buoy. At its upper end each riser is provided with a separate valve 14. At the top of the buoy there is arranged a thick-walled top plate 15 which is bolted to the central member 10 of the buoy. In the plate there are provided passages for pipe courses 16 in a number corresponding to the number of risers 12 in the buoy, for transfer of fluid between the risers and the rotating connector 1. At the lower ends of the fluid paths, the top plate 15 comprises a means for releasable connection with the upper ends of pipe sockets 17 projecting upwardly from the respective valves 14. For this purpose the outlets of the pipe courses 16 are shaped as socket or muff openings 18 for sealing receipt of the upper end portions of the pipe sockets 17, by axial introduction of the pipe sockets into the muff openings.

The rotating coupling device or connector 1 essentially comprises a swivel unit consisting of a pair of concentric swivel members in the form of a male member 20 and a female member 21 which, at an interface between the swivel members, define mutually sealed annular spaces or annuluses 22 in a number corresponding to the topical number of risers 12. On the one hand, the annuluses 22 communicate with the passages 16 in the top plate 15 via pipe courses arranged in the male member 20 in the manner described below, and on the other hand communicate with the non-illustrated pipe system on the vessel via associated outlets 23 in the female member 21. From each annulus there are expediently arranged two outlets (only one is shown), to reduce the total swivel height. In the illustrated case, the coupling device or connector may have a total height of about 6–7 m, and a diameter of about 1.5 m. The conduit connection between -he pipe system and the outlets from the annuluses conveniently may consist of flexible houses which are arranged in such a manner that the rotating connector 1 can be moved (by means of a suitable operating means) between the operating position shown in FIG. 1 and a parking position at the side thereof.

As will be clear, the permanent connection between the pipe system on the vessel and the female member outlets from the annuluses 22 presupposes that the female member is non-rotatably fastened to the vessel.

The male member 20 of the coupling device comprises a number of axially extending pipes or pipe courses 24 which, at their upper ends, are connected to respective annuluses 22, and which debouch at the underside of the male member and at their lower ends comprise an arrangement for releasable connection with the fluid paths 16 in the buoy top plate 15. This arrangement consists of a pipe joint means corresponding to the arrangement at the underside of the top plate, and the lower ends of the pipes 24 thus are adapted for sealing axial introduction into respective muff openings 25 at the upper outlets of the pipe courses 16.

Figure 5:
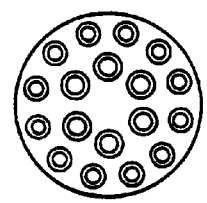
FIG. 5 shows the riser arrangement according to FIG. 3 as viewed from above.

The pipes or pipe courses 24 suitably are arranged in the same pattern as the risers 12, accordingly such as shown in FIG. 5 in the present embodiment, i.e. an outer circular circuit consisting of twelve pipes or pipe courses, and an inner circular circuit consisting of six pipes.

In the illustrated embodiment the swivel unit comprises a lower low-pressure part 26 consisting of a male member 27 and a female member 28, and an upper high-pressure part 29 having a smaller diameter than the low-pressure part and consisting of a male member 30 and a female member 31. The male member 27 of the lower part is formed from a tubular body (preferably made of steel) in which the outer circuit of pipe courses 24 consist of axial bores, and in which the inner circuit of pipes 24 is arranged along the circumference of the central, circular cylindrical space 32 of the body. At their upper ends the pipes 24 in the inner circuit pass into the corresponding pipe courses 33 which are arranged in a tubular body constituting the male member 30 of the upper part.

The lower and upper swivel parts 26 and 29 are releasably interconnected at an interface in which there is provided for an arrangement for releasable connection of the pipes or tubes 24 in the lower part 26 with the corresponding pipes or pipe courses 33 in the upper part 29. In a manner corresponding to that of the above-mentioned interconnection arrangements, this arrangement is constituted by a pipe joint means in which the upper ends of the pipes 24 are axially introduced in respective muff openings 34 formed at the lower outlet of the pipe courses 33, as more clearly shown in FIGS. 2A and 2B.

For the mutual sealing of the annuluses 22 respective sealing means 40 are arranged therebetween and on the outside of the outermost situated annuluses. These sealing means represent a further development of the seals shown and described in the introductorily mentioned patent application No. 932460. Alternative embodiments of the sealing means are more clearly shown in FIGS. 2A and 2B which show enlarged views of the region A in FIG. 1.

In order to obtain full control of clearances in all sealing surfaces, and to obtain a completely pressure-balanced sealing means, the seal is divided into a static and a movable part.

Figure 2A:
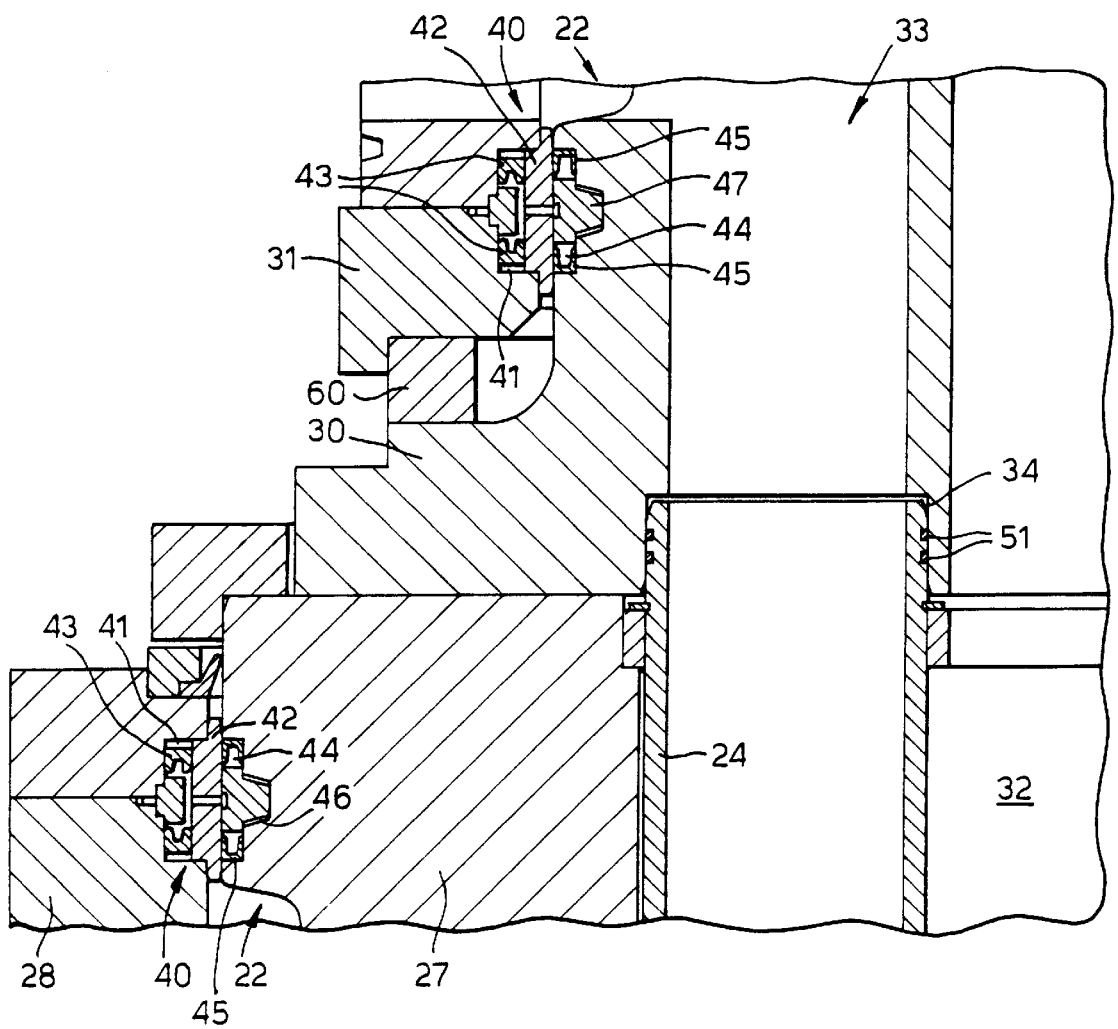
FIGS. 2A and 2B show the region A in FIG. 1 on an enlarged scale, with alternative embodiments of sealing means.

As appears from FIG. 2A, the female member 28, 31 of the swivel unit on each side of each annulus 22 is provided with a peripherally extending annular groove 41 receiving a ring element 42 which is slidably and limitedly radially movable in the annular groove. In the illustrated embodiment, the ring element 42 has a thickness resulting in that the element extends somewhat outside the annular groove 41. At the upper side and the lower side the ring element has flange edges extending into the gap between the male member 30 and the female member 31. In the annular groove 41 there is arranged a static sealing means comprising a pair of lip seals 43 for static sealing between the ring element 42 and the female member when the coupling device is in operation. Also in the male member 27, 30, just opposite to the ring element, there is arranged an annular groove 44 receiving a pair of lip seals 45 to form, during operation, a dynamic seal between the male member and the ring element.

In the annular groove 44 of the male member 27, 30 there is centrally arranged a recess or mounting groove 46 which is used in the mounting of small elastic sealing elements 45, i.e. sealing elements not having a sufficiently large flexibility to be able to be stretched over the male member and into its groove. After the sealing elements have been put in place, as shown in FIG. 2A, the recess is closed by means of a bearing surface ring 47. Both the ring element 42 and the bearing surface ring 47 are made of steel and typically consist of a pair of ring halves which are screwed together.

Both the static and the dynamic sealing means can be activated hydraulically by means of a barrier liquid (e.g. hydraulic oil) having a higher pressure than the process fluid pressure supplied to the annular groove. In a manner which is not more specifically shown, the barrier liquid is supplied from the vessel to the female member which contains channels (not shown) for supply of the liquid to the different annular grooves. As a result of the fact that the barrier liquid has a higher pressure than the process medium pressure, leakage across the coupling is controlled, and one can at any time measure the condition of the different seals, and carry out planned replacement of elements before a leakage becomes critical. The ring element 42 will be pressure equalized in that it is surrounded and influenced by barrier liquid on opposite sides, and at the upper and lower sides is in contact with the medium against which it is to be sealed.

Figure 2B:
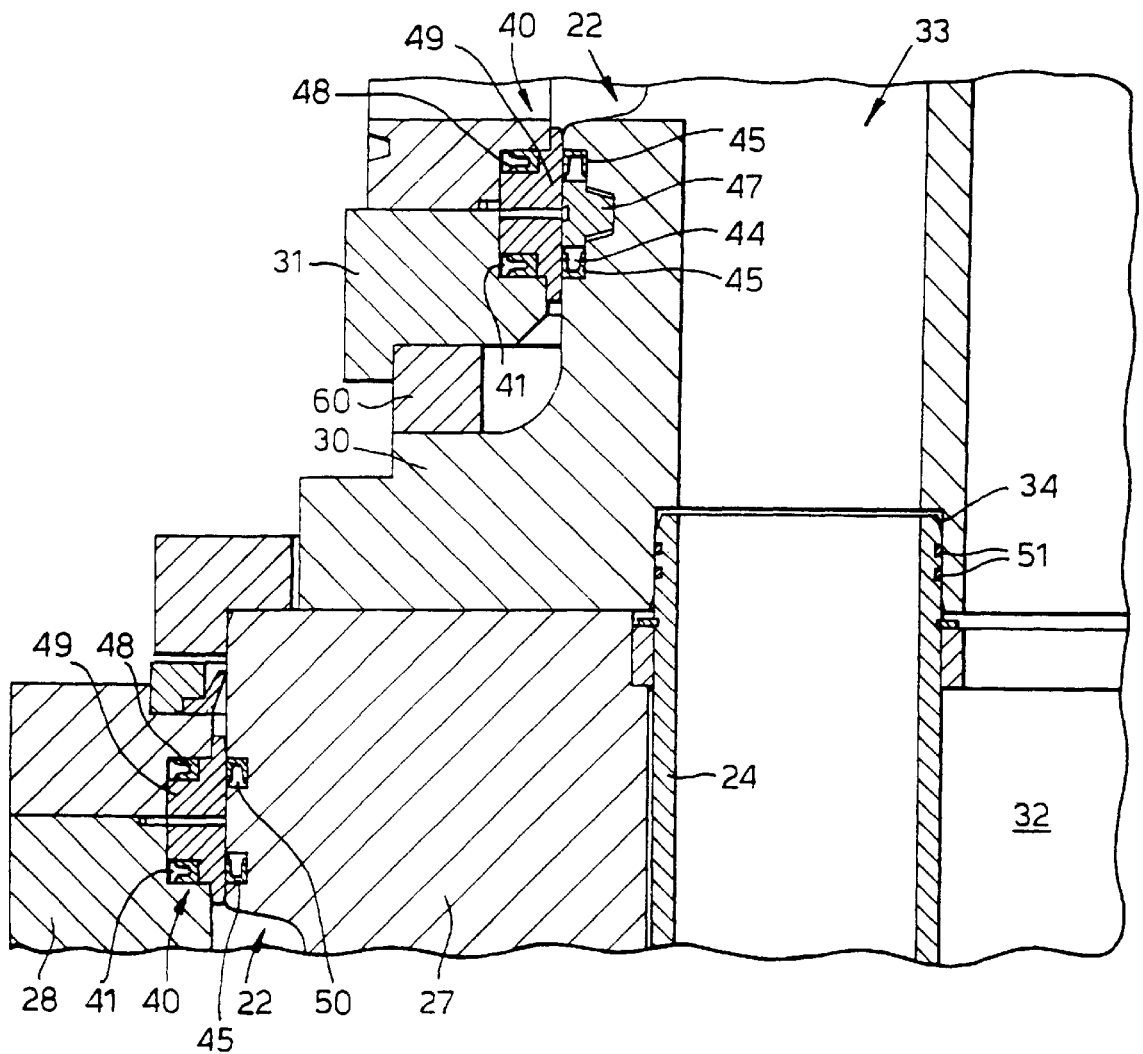

FIG. 2B shows alternative embodiments of the sealing means. As shown uppermost in FIG. 2B, the static lip seals 48 are rotated 90° relative to the embodiment in FIG. 2A, and face radially outwards with their U-shaped openings. A safe seal is then obtained, even with a large gap between the male and female members (the members are pressed apart with a high pressure). The locking effect between the static seals and the ring element 49 is, however, weakened in this embodiment, and in order to prevent a relative movement between the female member 31 and the ring element 49, pins and grooves (not shown) preventing rotational movement will be arranged therebetween in a preferred embodiment.

At the bottom of FIG. 2B there is shown a third embodiment wherein the male member 27 is provided with a pair of separate grooves 50 for the dynamic sealing elements 45. This embodiment presupposes that sealing rings are used which are somewhat resilient, so that they can be stretched somewhat in connection with the mounting in the respective grooves 50.

When looking at FIG. 2, it will be seen that the clearance between the movable sealing surfaces is constant, and independent of the process medium pressure and the pressure of the barrier liquid, since the same pressure acts on both sides of the ring element 42 and 49, respectively. With the shown solution there may be used different sealing or packing elements, of different shape and different materials, adapted to different mediums and environments in the different passages or courses in the same coupling. By adapting ring element and groove one can utilize the type of sealing ring which turns out to be best suited for each concept.

In FIG. 2 also the pipe joint arrangement for interconnection of the pipe courses in the upper and lower parts of the swivel unit is shown more in detail. In the shown embodiment, each joint means consists of a standard pipe joint wherein the upper end of each pipe 24 is provided with annular grooves for the receipt of sealing rings or gaskets 51 for sealing against the inner wall of the respective muff opening 34 at the opposite interface.

The interconnection means discussed above, more specifically between the rotating connector and the top plate 15 of the buoy, and between the top plate and the pipes 17 from the riser valves, also constitute critical pipe joints, and these may also consist of standard pipe joints of a design corresponding to that of the pipe joints between the upper and lower swivel parts.

As appears from FIG. 1, the male member 20 (or 27, 30) of the swivel unit comprises a central, axial passage 52 which is partly constituted by the central part of the cylindrical space 32 of the male member 27. This passage is intended for receiving cables (not shown) for signal and power transfer. These cables (including hydraulic lines) are connected to an electro-hydraulic swivel (not shown) arranged at the top of the swivel unit, and to a contact means suggested at 53 at the bottom of the swivel unit. The electro-hydraulic swivel is of a commercially available type, e.g. a so-called "Focal" swivel.

As will be understood, the top plate 15 in practice will also be provided with the necessary means for further connection of the topical signal lines and cables via the buoy to the topical subsea installation.

As shown in FIG. 1, the top plate 15 of the buoy comprises a flange edge 54 for attachment of the coupling device or connector 1 by means of a suitable clamping means. The clamping means consists of a pair of per se known toggle joint means 55 which are operated by means of hydraulic cylinders 56. Further, the lower male member 27 at its lower end is provided with an outwards extending flange portion 57 for rotatable support of the female member 28 via a slide bearing ring 58. In a corresponding manner the upper male member 30 is provided with an outwards extending flange portion 59 for rotatable support of the upper female member 31 via a slide bearing ring 60.

The present rotating connector is constructed for use on permanently located production vessels. Disconnection of the buoy from the connector can take place quickly, but connection will be somewhat more time-consuming. When interconnecting the connector and the buoy, it is obvious that these must be correctly oriented in relation to each other. This is done in that the male member 20 is rotated to the correct position by means of a turning machine.

Figure 3:
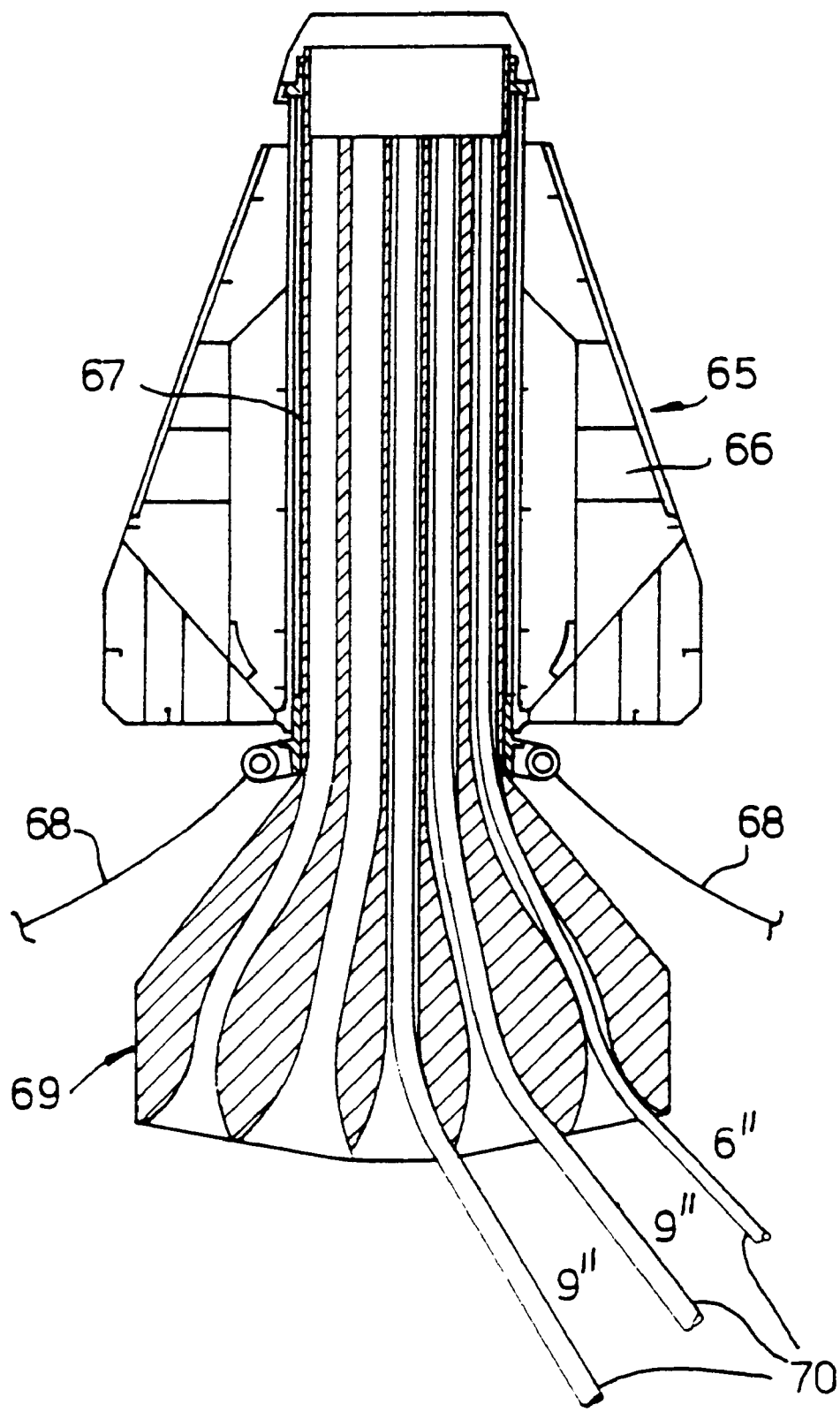
FIG. 3 shows a partly sectioned side view of a buoy having a so-called bellmouth for guidance of risers suspended from the buoy.
Figure 4:
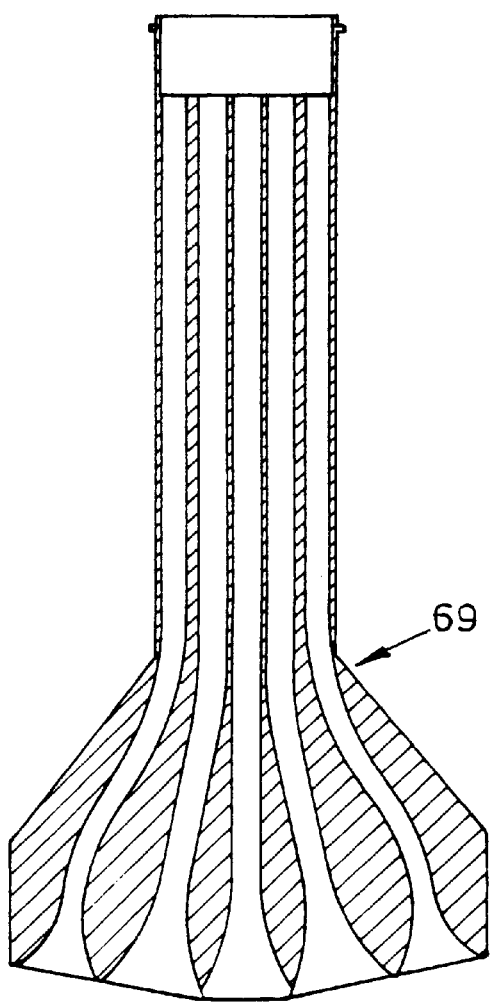
FIG. 4 shows a schematic sectional side view of the guide means in FIG. 3.
Figure 6:
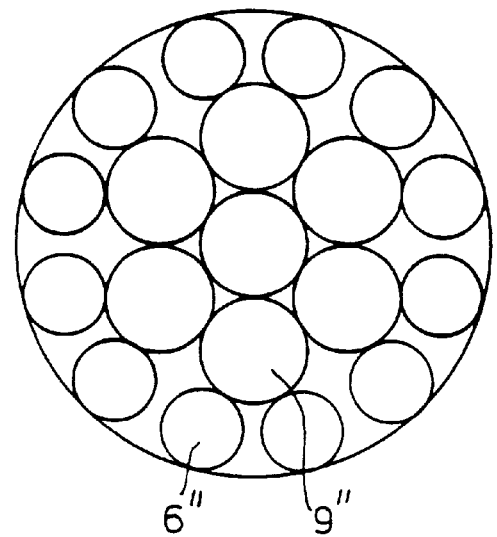
FIG. 6 shows the guide means in FIG. 4 as viewed from below.

A topical arrangement for the risers in connection with a buoy is shown in FIG. 3. The Figure shows a partly sectioned view of an STP buoy 65 which, in the usual manner, consists of an outer buoyancy member 66 which is rotatably mounted on an inner or central buoy member 67 which is anchored to the sea bed by means of anchor lines 68. In the central buoy member 67 there is mounted a so-called bellmouth 69 which is shown in schematic sectional view and in plan view, respectively, in FIGS. 4 and 6. FIG. 5 shows the riser arrangement in FIG. 3 as viewed from above. The bellmouth means 69 serves to spread the risers 70 at the underside of the buoy, so that they cannot lie striking against each other. The bellmouth also ensures that the risers do not get a sharp buckle at the inlet to the buoy. In FIG. 3 there is shown depicted two 9" risers and one 6" riser 70. The bellmouth means 69 may, for example, have a height of about 15 m, and a diameter at the lower end of about 7 m.

Figure 7:
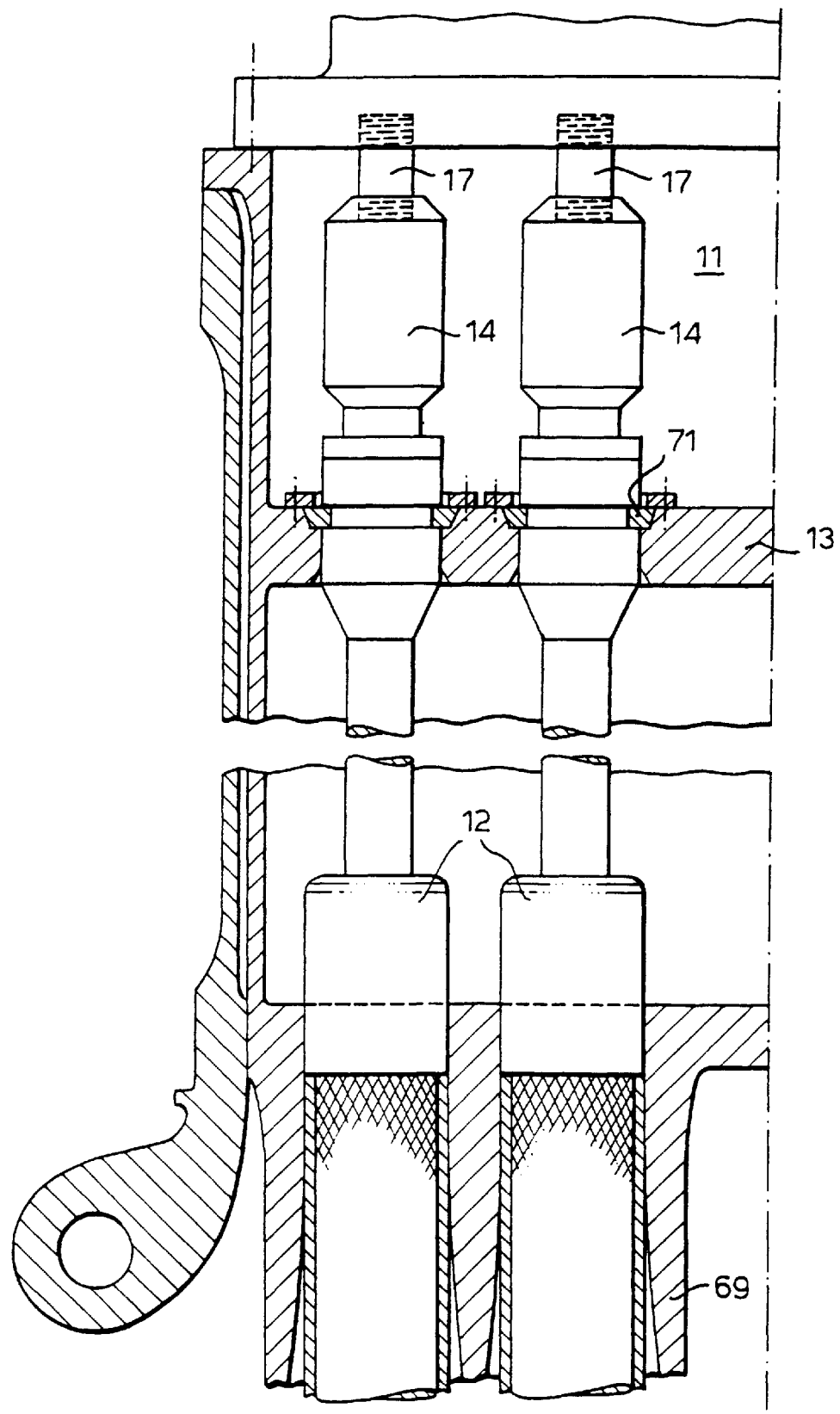
FIG. 7 is a partial sectional view which shows more in detail the suspension arrangement for the risers in a buoy.

The suspension arrangement for the risers is shown more in detail in FIG. 7. The upper end portions of the risers 12 are shown to be suspended from the suspension plate 13 in the buoy. Advantageously, suitable sealing means 71 are provided for here, to be able to control liquid in the space 11 around the valves 14, because of electrical contacts present in the space.

Mounting of the risers takes place in that each riser 12 is pulled up through the bellmouth 69 and through the buoy up to a suspension plate or suspension ring (not shown) in the vessel. Thereafter, the riser valve 14 is mounted, and the riser is lowered in the buoy so that -he riser is hung off and fastened to the suspension plate 13. The risers are pulled up by turns and mounted in this manner. After completed assembly of the risers, possible liquid in the space around the valves is controlled, whereafter the top plate of the buoy is fixedly bolted at the top of the buoy.

In case of maintenance or repair of the valves, one can in a corresponding manner pull the risers up into the vessel and carry out the topical maintenance work.

What is claimed is:

1. A rotating connector for interconnection between a plurality of risers suspended from a submerged buoy and a pipe system on a floating vessel for the production of hydrocarbons, comprising:

a swivel unit consisting of a pair of concentric swivel members in the form of a male member and a female member, the male and female member defining a plurality of mutually sealed annuluses, each annulus communicating with a respective fluid path extending between a corresponding one of the risers and the pipe system on the vessel, wherein the female member is arranged to be non-rotatably secured to the vessel;

a plurality of pipe courses extending within the male member, an upper end of each pipe course being connected to a respective annulus and a lower end of each pipe course communicating with the corresponding riser, wherein the pipe courses are constituted by axially extending first pipes, a lower end of each of first pipe comprising first means for releasable interconnection with the respective fluid path leading to the respective risers; and a thick-walled top plate adapted to be fastened to a top of the buoy, wherein the fluid paths extend through the top plate, lower ends of the fluid paths comprising second means for releasable interconnection with upper ends of second pipes leading to the risers.

2. A connector according to claim 1, wherein the swivel unit comprises a lower low-pressure part and an upper high-pressure part with a low-pressure portion of the annuluses being formed by portions of the male and female members constituting the lower part and a high-pressure portion of the annuluses being formed by portions of the male and female members constituting the upper part,, the upper part having a diameter smaller than a diameter of the lower part, wherein an outer portion of the first pipes form an outer circuit of the first pipes extending between the top plate and the respective low-pressure annuluses, and an inner portion of the first pipes form an inner circuit of the first pipes extending between the top plate and the high-pressure annuluses, the outer circuit extending through the male member radially outside the inner circuit.

3. A connector according to claim 2, wherein the outer circuit of first pipes comprises twelve first pipes, and the inner circuit of first pipes comprises six first pipes.

4. A connector according to claim 2, wherein the male member of the swivel unit comprises a central axial passage for receiving cables for the transfer of signals and power.

5. A connector according to claim 4, the cables being connected to an electro-hydraulic swivel at a top of the swivel unit and to a contact means at a bottom of the swivel unit.

6. A connector according to claim 2, wherein a plurality of under muff openings are formed in an underside of the top plate, the second means for releasable interconnection comprising pipe joint means in which upper ends of each of the second pipes is adapted for axial introduction in a respective one of the under muff openings.

7. A connector according to claim 2, wherein the lower and upper swivel parts are releasably interconnected at an interface, the interface comprising means for releasably interconnecting a lower portion of each first pipe of the inner circuit of first pipes extending within the lower swivel part with a corresponding upper portion of each first pipe extending within the upper swivel part.

8. A connector according to claim 1, wherein a plurality of top muff openings are formed in a top side of the top plate, the first means for releasable interconnection comprising pipe joint means in which the lower end of each of the first pipes is adapted for axial introduction into a respective one of the top muff opening.

9. A connector according to claim 1, wherein a lower end of the male member includes means for attachment of the male member to a peripheral flange on the top plate.

10. A connector according to claim 1, wherein a lower end of the male member includes an outwardly extending flange portion for slidable support of the female member via a slide bearing ring.

* * * * *